S. F. MORRISON.
CAR TRUCK.
APPLICATION FILED AUG. 3, 1908.
917,343.
Patented Apr. 6, 1909.
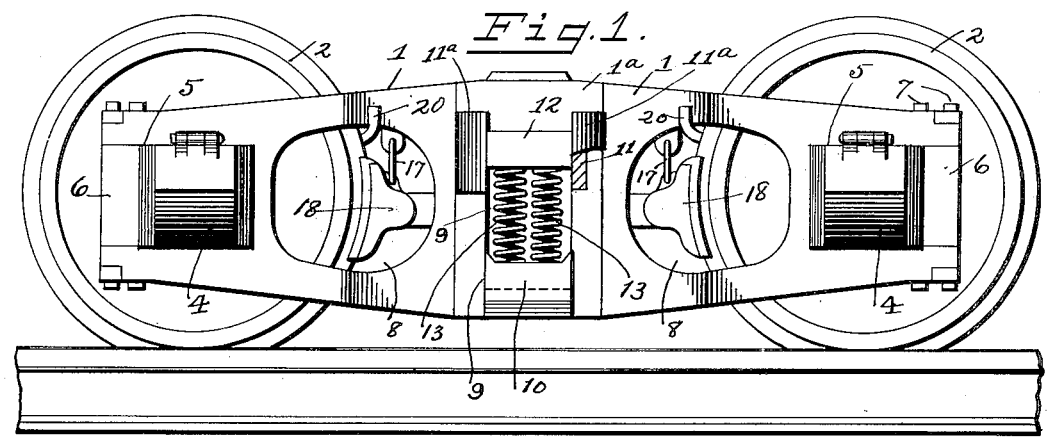
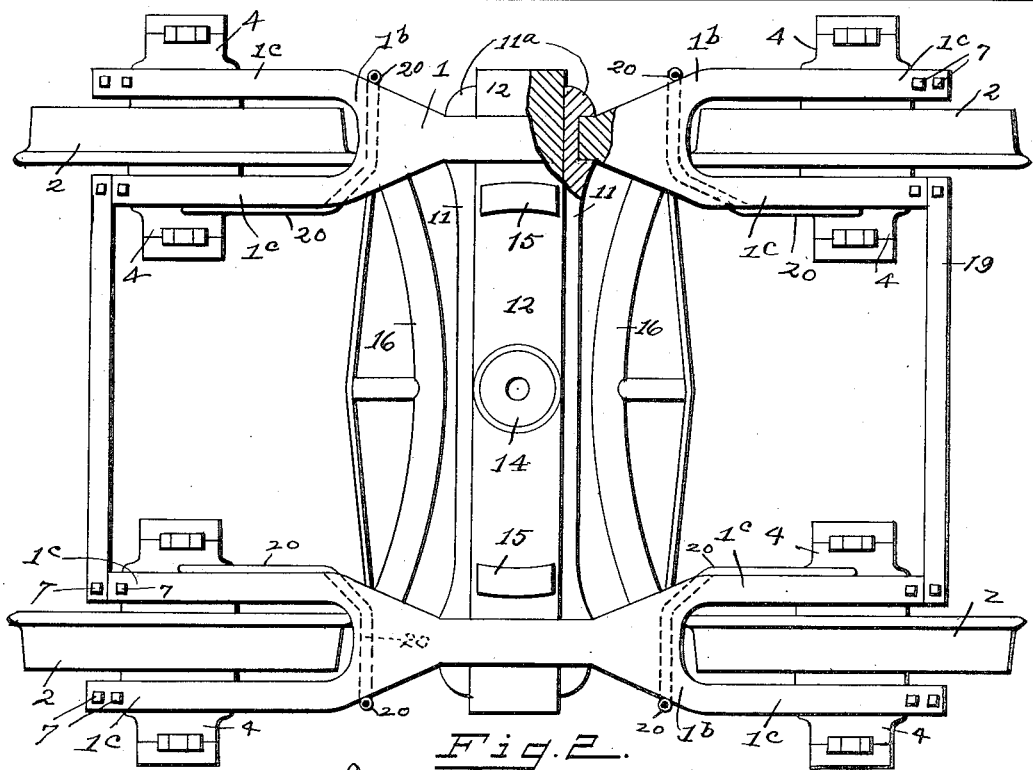
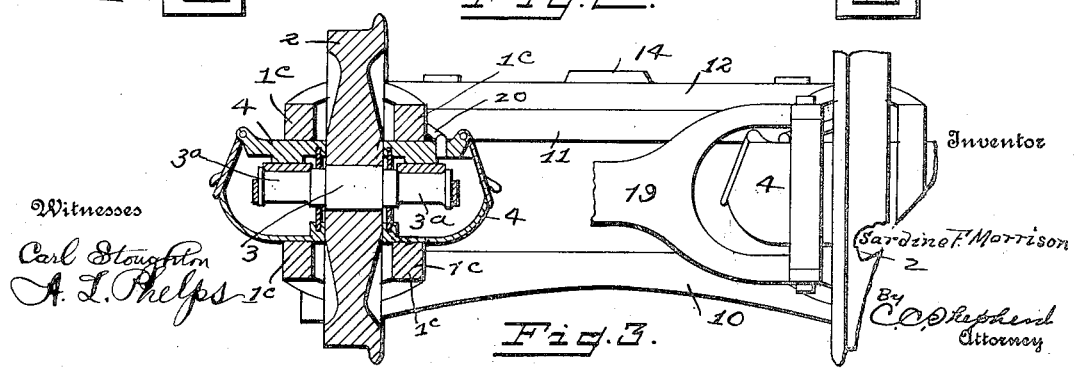

UNITED STATES PATENT OFFICE.

SARDINE F. MORRISON, OF COLUMBUS, OHIO.

CAR-TRUCK.

No. 917,343.

Specification of Letters Patent.

Patented April 6, 1909.

Application filed August 3, 1908. Serial No. 446,668.

*To all whom it may concern:*

Be it known that I, SARDINE F. MORRISON, a citizen of the United States, residing at Columbus, in the county of Franklin and State of Ohio, have invented certain new and useful Improvements in Car-Trucks, of which the following is a specification.

My invention relates to the improvement of car trucks and the objects of my invention are to provide an improved construction of car truck frame embodying simplicity and strength; to so construct my improved truck frame as to permit of the side members thereof being cast in one piece; to provide each car wheel with an independent axle and bearing, so constructed as to admit of the wheels being interchangeable and to admit of one wheel being removed or changed without removing or interfering with the other wheels; to provide in connection with my improved frame an improved bolster construction and to produce other improvements the details of which will be more fully pointed out hereinafter. These objects I accomplish in the manner illustrated in the accompanying drawing, in which:

Figure 1 is a side elevation of my improved truck frame, Fig. 2 is a plan view of the same, and, Fig. 3 is a partial section and partial end view the section being taken vertically through the center of one of the car wheels and its bearings.

Similar numerals refer to similar parts throughout the several views.

1 represent the opposing side frames of my improved truck, each of which is formed of one piece of material and comprises a comparatively narrow central portion 1ª from which extend bifurcated end portions 1ᵇ. Within the bifurcation of each of the side frame members is journaled a car wheel 2 of the usual form, each of said car wheels being provided with a central comparatively short axle 3, the spindle extensions 3ª of which bear in suitable boxings 4 which are mounted in end recesses of the parallel arms 1ᶜ which are formed by the bifurcation of the frame ends. Each of said end recesses which are indicated at 5, is adapted to have the boxing 4 slidably inserted therein, in which position the boxing is held against outward movement by an end closure or retainer bar 6 which is held between the outer ends of the arms 1ᶜ by means of bolts 7 which pass through the outer end portions of said arms.

Opposite the inner or rear portion of each of the wheels 2, I form an opening 8 in each of the side frame members 1. I also provide a central vertical opening 9 in each of said side frame members and extending through the lower ends of these openings 9 and secured therein, are the ends of a bolster bearing bar 10 which extends between the side frames. Extending through the upper portions of the openings 9 and secured in opposite sides thereof are parallel frame bars 11, the latter fitting in offsets of the openings 9 and being provided with enlarged or flanged end portions 11ª, which engage the outer sides of the side frames 1.

12 represents the bolster bar which extends loosely between the parallel frame bars 11 and which bears upon springs 13 which in turn bear upon the bearing bar 10. The bolster 12 has that portion of its body which is between the inner faces of the side frames 1 raised and said raised portion is provided with a central socket projection 14 to facilitate the usual pivotal connection of the car therewith and with suitable car bearing projections 15.

16 represent the brake beams, the end portions of which extend in rear of each pair of car wheels, said brake beams being suspended from the side frames as indicated at 17, and provided with the usual brake shoes 18, the latter being carried by said brake beams within the openings 8 of the side frames. The side frames are rigidly connected at each end by a horizontal bar or connecting member indicated at 19.

In order to provide a means of supplying oil to each of the axles, I employ oil conducting pipes 20 which are suitably secured to the side frames and which, as shown, lead from points above the openings 8 and on the outer side thereof downward, thence through said openings and along the inner sides of the inner side frame arms 1ᶜ, thence downward into the axle boxings.

From the construction herein shown and described, it will be seen that the one piece side frames of the truck, are of simple construction and of such form as to insure great strength. The bifurcated ends of these side frames provide means for the independent bearing of each car wheel, thereby obviating the necessity of employing a comparatively long axle which carries a wheel at either end and which in case of breakage of the axle or injury to one of the wheels, requires the removal of both wheels.

The construction herein shown, permits of the wheels being used interchangeably and also obviates the necessity when one wheel is broken or injured, of substituting a wheel of exactly the same circumference as that employed on the opposite side of the truck.

What I claim, is:

1. In a car truck, the combination with connected side truck frames, each of said side frames being formed of a single piece of material, the end portions of which are bifurcated, said bifurcated portions having boxing openings, of bearing boxes in said openings, wheel carrying axles having bearings in said boxes, and a bolster between said frames.

2. In a car truck, the combination with connected side truck frames, each of said side frames being formed of a single piece of material and comprising a comparatively narrow central portion and outwardly extending bifurcated end portions, the arms formed by said bifurcations having openings therein, of bearing boxes in said openings, a wheel carrying axle journaled in the bifurcated portion of each end of each of said side frames, and a spring supported bolster extending between the central portions of said side frames.

3. In a car truck, the combination with connected side truck frames, each of said side frames being formed of a single piece of material and having its ends bifurcated, an axle journaled in each of said bifurcated portions, and a car wheel carried by each of said axles, of a bolster bearing bar rigidly connecting the lower and central portions of said side frames, parallel bars connecting said side frames on opposite sides of the center thereof, a car bearing bolster between said parallel bars, and springs between said bolster and said bolster bearing bar.

In testimony whereof I affix my signature in presence of two witnesses.

SARDINE F. MORRISON.

Witnesses:
L. CARL STOUGHTON,
A. L. PHELPS.